June 20, 1967     F. A. MIGEOT ET AL     3,326,529
CABLE GUIDING DEVICE
Filed Dec. 13, 1965     3 Sheets-Sheet 1
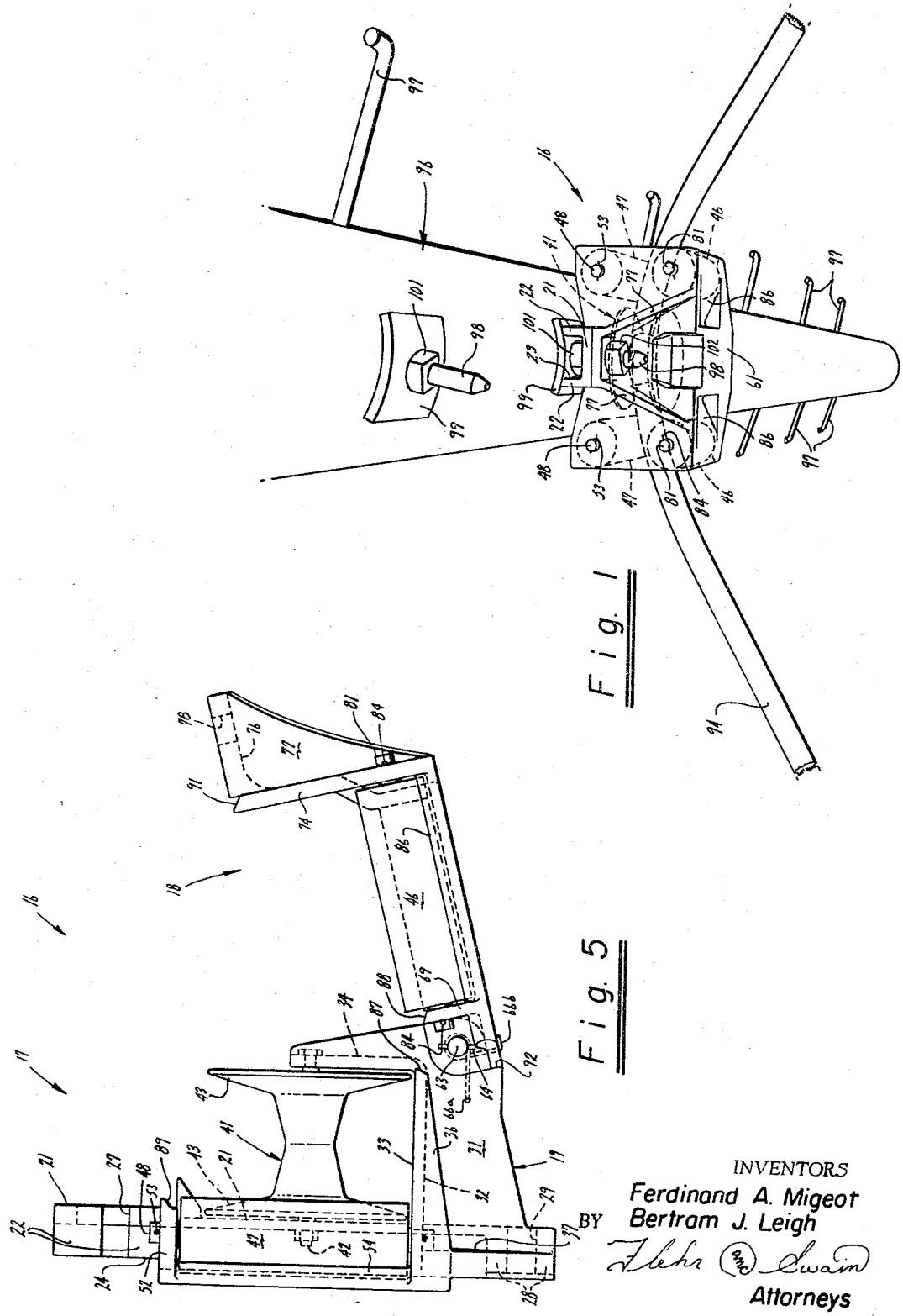
INVENTORS
Ferdinand A. Migeot
Bertram J. Leigh
BY
Attorneys

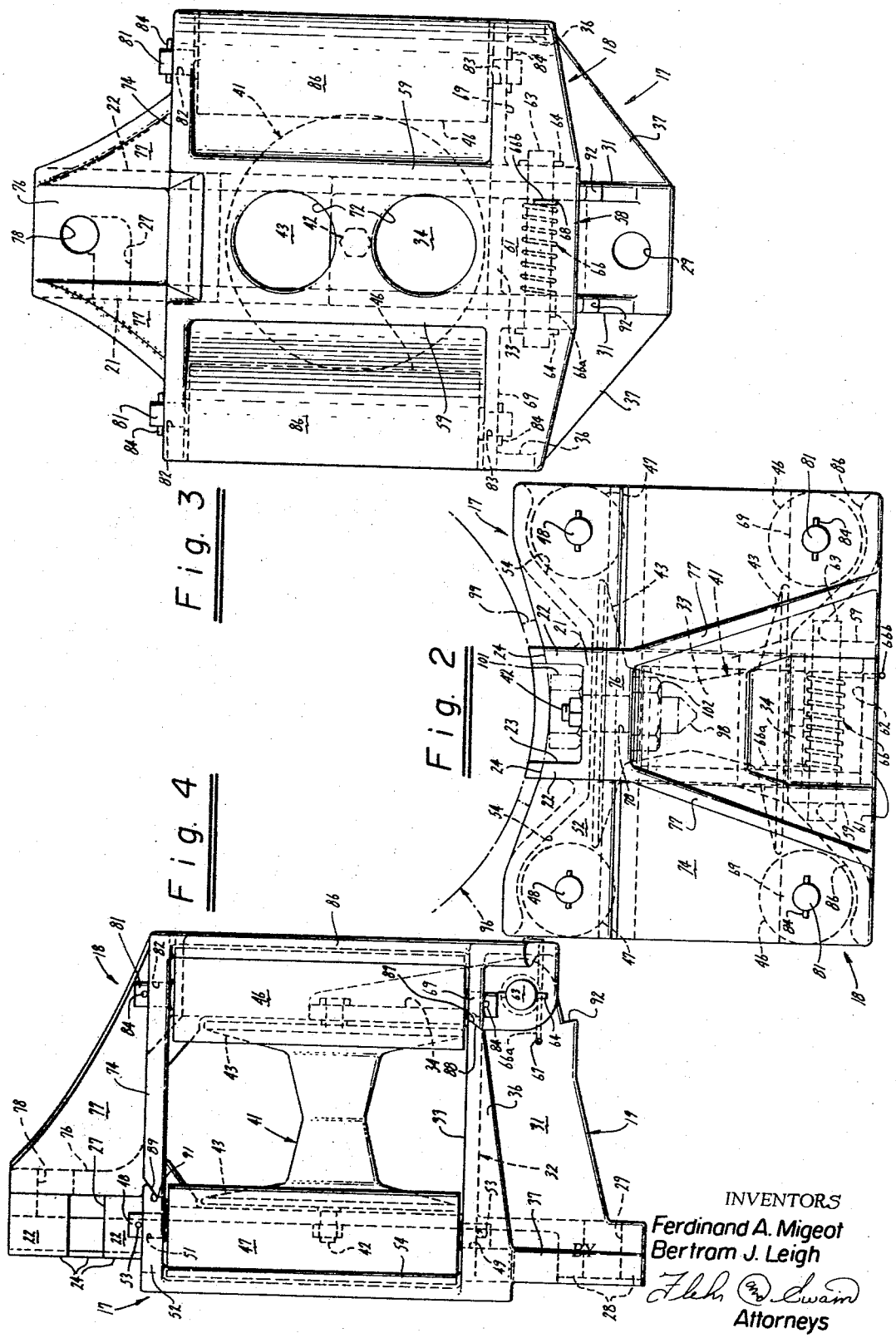

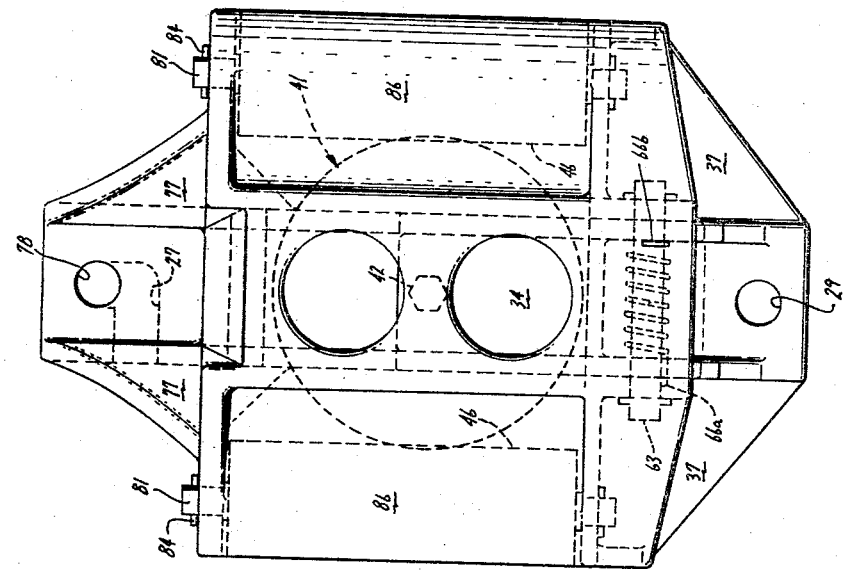

United States Patent Office 3,326,529
Patented June 20, 1967

3,326,529
CABLE GUIDING DEVICE
Ferdinand A. Migeot, Oakland, and Bertram J. Leigh, Redwood City, Calif., assignors to Telsta Corporation, San Carlos, Calif., a corporation of California
Filed Dec. 13, 1965, Ser. No. 514,172
17 Claims. (Cl. 254—193)

This invention relates to a cable guiding device and more particularly to a cable guiding device which can be utilized for the stringing of wire, cable and the like under tension.

Cable guiding devices have heretofore beeen provided for various applications. However, such rollers and cable guiding devices have been relatively bulky and expensive and, in addition, have been relatively heavy so that it is difficult for the line men to position the same on a pole above the ground. There is, therefore, a need for a new and improved cable guiding device.

In general, it is an object of the present invention to provide a cable guiding device which overcomes the above named disadvantages.

Another object of the invention is to provide a cable guiding device which can be used on inside and outside corners.

Another object of the invention is to provide a cable guiding device of the above character in which a single cable guiding device can be used for inside and outside corners and straight pulls.

Another object of the invention is to provide a cable guiding device of the above character which is light in weight and which is economical to manufacture.

Another object of the invention is to provide a cable guiding device of the above character which can carry loads such as those encountered in pulling cable under high tension.

Another object of the invention is to provide a cable guiding device of the above character which can be readily mounted upon a pole and removed from the pole.

Another object of the invention is to provide a cable guiding device of the above character which is self-contained.

Another object of the invention is to provide a cable guiding device of the above character which does not disturb the sag of a cable after it is removed.

Additional objects and features of the invention will appear from the following description in which the preferred embodiments are set forth in detail in conjunction with the accompanying drawings.

Referring to the drawings:

FIGURE 1 is a perspective view of a cable guiding device incorporating the present invention mounted upon a pole.

FIGURE 2 is a top plan view of the cable guiding device shown in FIGURE 1.

FIGURE 3 is a front elevational view of the cable guiding device shown in FIGURE 2.

FIGURE 4 is a side elevational view of the cable guiding device shown in FIGURE 2.

FIGURE 5 is a side elevational view similar to FIGURE 4 but showing the cable guiding device in an open position.

FIGURE 6 is a top plan view of the cable guiding device in FIGURES 1–5 with the rear guide rollers removed.

FIGURE 7 is a front elevational view of the cable guiding device shown in FIGURE 6.

FIGURE 8 is a side elevational view of the cable guiding device shown in FIGURE 6.

In general, the cable guiding device consists of a support member. A roller is rotatably mounted on the support member. The cable guiding device also includes a gate member. Means is provided which connects the gate member to the support member for swinging movement between open and closed positions with respect to the support member. The support member and gate member are formed so that when the gate member is in a closed position, the roller is enclosed to prevent the escape of the cable therefrom.

More particularly as shown in the drawings, the cable guiding device consists of a support member 17 and a gate member 18. The support member 17 and gate member 18 can be formed of any suitable material and in any suitable manner. For example, the members 17 and 18 can be formed as steel or aluminum castings. When formed as a casting as shown in the drawings, the support member 17 consists of a U-shaped member 19 which is formed with a front wall 21 and a pair of spaced parallel side walls 22 which extend rearwardly from the front wall in a direction substantially at right angles to the front wall. Thus, it can be seen that a recess 23 is formed by the U-shaped member which opens to the rear. The side walls 22 are provided with cutouts 24 and the upper rear extremity is adapted to accommodate a washer of a conventional type, hereinafter described, utilized for pole line hardware. An L-shaped cutout or slot 27 is also formed in the upper portion of the U-shaped member 19. The cutout commences in the central upper portion of the front wall 21 and extends first downwardly and then towards one side wall 22 and through one of the side walls 22 (see FIGURES 3 and 4). A fillet 28 is formed on the rear side of the forward wall 21 at the lower extremity thereof and a hole 29 extends through the forward wall 21 and through the fillet 28. The fillet is provided with a rear curved outer surface 30 which is adapted to be mounted against a pole as hereinafter described.

The support member 17 also includes a pair of spaced parallel support arms 31 which are formed integral with the lower portion of the U-shaped member 19. As can be seen particularly from FIGURE 5, the support arms 31 extend forwardly and upwardly from the lower extremity of the U-shaped member so that the upper extremity of the support arms terminates at a point which is substantially equidistant from the upper and the lower extremities of the U-shaped member 19. An additional L-shaped plate-like member 32 is also provided and is formed integral with the lower portion of the U-shaped member 19 and with the support arms 31. As can be seen in FIGURE 5, the L-shaped member 32 forms a bottom wall 33 and a side wall 34 which is perpendicular to the bottom wall 33 and parallel to the front wall 21 of the U-shaped member 19. Reinforcing webs 36 are provided on opposite sides of the support arms 31 and are formed integral with the bottom portions of the L-shaped member 32 and sidewardly extending reinforcing webs 37 which are formed integral with the lower portion of the U-shaped member 19.

A large roller 41 is rotatably mounted between the upper extremity of the L-shaped member 32 and the front wall 21 of the U-shaped member 19 by suitable means such as a large bolt 42. As can be seen from FIGURE 4, the bolt 42 extends through the upper extremity of the L-shaped member 32, through the roller 41, and through the front wall 21 of the U-shaped member 19. As shown in FIGURE 5, the roller 41 is mounted so that its axis of rotation is at right angles to the front wall 21 and the upper extremity of the L-shaped member 32. The roller 41 is preferably of a type which is provided with outwardly extending side flanges 43. The support member 17 is dimensioned so that the front wall 21 and the upper extremity of the L-shaped member 32 are adjacent the flanges 43 and so that the bottom wall 33 is also adjacent the outer extremities of the flanges 43.

The cable guiding device 16 also includes guiding means disposed on opposite sides of the roller 41 and expanding generally in a direction at right angles to the axis of rotation of the roller 41. In the embodiment of the invention shown in FIGURES 3, 4 and 5, such guide means takes the form of a pair of spaced parallel front guide rollers 46 and spaced parallel rear guide rollers 47 which are also spaced from and parallel to the front guide rollers 46. The front guide rollers 46 are mounted upon the gate member 18 as hereinafter described. The rear guide rollers 47 are rotatably mounted upon the support member 17 in a suitable manner. Thus, as shown in the drawings, the rear guide rollers 47 are rotatably mounted upon pins 48. The lower extremities of the pins 48 are disposed in holes 49 provided in the lower extremity of the L-shaped member 32. The upper extremities of the pins 48 are disposed in holes 51 provided in sidewardly extending ears 52 formed integral with the U-shaped member 19 and forming a part of the support member 17. The pins 48 are held in place by retaining pins 53. Curved reinforcing webs 54 (FIGURE 2) extend between the ears 52 and the member 32 and are formed integral with the ears 52, the plate 32, and the U-shaped member 19. These webs 54 have rounded outer ends so they will not damage the cable if it should accidentally come in contact therewith.

The gate member 18 includes a U-shaped member 58 which is provided with spaced parallel side walls 59 and a front wall 61 extending at substantially right angles to the side walls 59. The U-shaped member forms a recess 62 which opens to the rear and which is adapted to accommodate the support arms 31 of the support member 17. It can be seen particularly from FIGURE 3 that the side walls 59 of the U-shaped member 58 are disposed alongside the support arms 31. Means is provided for connecting the gate member 18 to the support member 17 to permit swinging movement of the gate member 18 between open and closed positions with respect to the support member 17 and consists of a pin 63 which extends through the side walls 59 and the side walls 22 and which is retained therein by retaining pins 64. Means is also provided for yieldably urging the gate member 18 towards a closed position and consists of a helical spring 66, one end 66a of which extends through a hole 67 provided in one of the support arms 31 and another end 66b which extends through a hole 68 provided in a plate 69 which is formed integral with the U-shaped member 58 and extends in a direction at right angles to side walls 59 of the U-shaped member 58. Reinforcing webs 71 are provided on opposite sides of the U-shaped member 58 and are formed integral therewith and the plate 69 to reinforce the same. The front wall 61 of the U-shaped member 58 is provided with lightening holes 72.

The gate member 18 also includes a top plate 74 which is formed integral with the upper extremity of the U-shaped member 58 and which extends in a direction at right angles to the side walls 59 and parallel to the plate 69. An upwardly extending ear 76 is formed integral with the top plate 74 intermediate the sides thereof and at the rear of the plate 74. A pair of outwardly and forwardly divergent webs 77 are formed integral with the top plate 74 and with the upwardly extending ear 76. A hole 78 is provided in the ear 76 and is positioned so that it is in registration with the upper extremity of the L-shaped slot 27 provided in the support member 17 when the gate member 18 is in a closed position.

The front guide rollers 46 are rotatably mounted between the top plate 74 and the lower plate 69 by pins 81, the upper extremities of which are disposed in holes 82 provided in the top plate 74 and the lower extremities of which are disposed in holes 83 provided in the lower plate 69. The pins 81 are held in place by retaining pins 84.

The gate member includes an additional reinforcing in the form of curved webs 86 which extend between the top plate 74 and the lower plate 69 and are formed integral with the U-shaped member 58 and the top plate 74 and the lower plate 69 (see FIGURE 2). These reinforcing webs 86 are formed so that they are disposed adjacent the front sides of the front guide rollers 47 whereas webs 54 are disposed adjacent the rear sides of the rear guide rollers 46.

In order to strengthen the cable guiding device, the support member 17 and the gate member 18 have been provided with mating surfaces. Thus, the reinforcing webs 36 have been provided with inclined surfaces 87 which mate with an inclined surface 88 provided on the lower plate 69. Similarly, the ears 52 have been provided with an inclined surface 89 which mates with an inclined surface 91. These mating surfaces will ensure that forces applied to the cable guiding device 16 in a direction at right angles to the axis of rotation for the roller 41 are distributed over the entire cable guiding device.

In order to limit the outermost travel of the gate member 18 in its extreme open position, stop means in the form of abutments 92 have been provided upon the support arms 31 which are adapted to be engaged by the lower extremities of the curved reinforcing members 86 to prevent the gate member from swinging beyond the position shown in FIGURE 5.

Operation and use of the cable guiding device shown in FIGURES 1–5 of the drawings may now be briefly described as follows. Let it be assumed that it is desired to utilize the cable guiding device in a typical cable stringing operation as, for example, the stringing of a self-supporting cable or a prelashed cable upon a pole line. As is well known to those skilled in the art, such a pole line includes a plurality of poles 96, one of which is shown in FIGURE 1. Such poles may include steps 97 to facilitate climbing of the poles. Such a pole line also typically includes suspension bolts 98 which extend through the poles and which are provided with curved washers 99 and nuts 101. When such pole line hardware is in place, the cable guiding devices 16 can be placed upon the poles 96 either by the workmen climbing the poles or by the use of a suitable aerial lift. In placing the cable guiding device, the cable guiding device is positioned so that the bolt 98 extends through the L-shaped slot 27 provided in the support member 17. At approximately the same time, the gate member is positioned so that the bolt 98 also extends through the hole 78. Thereafter, an additional nut 102 is threaded on the bolt 98 to hold the cable guiding device on the bolt and also to retain the gate member 18 in a closed position with respect to the support member 17 (see FIGURE 1).

After the cable guiding devices have been placed upon the poles, the self-supporting cable 94 can be strung in a conventional manner. For example, as the cable guiding devices 16 are positioned on the poles, a small pilot rope or line can be placed in the cable guiding devices so that it extends through the cable guiding devices and overlies the rollers 41. After cable guiding devices have been placed on all the desired poles and the pilot rope has been placed therethrough, the pilot rope is secured to a winch line as, for example, a steel winch line. The pilot rope is then drawn through the rollers to bring the winch line through the rollers. As soon as this has been accomplished, the winch line is secured to the cable which it is desired to place under tension. The winch line is then withdrawn from the cable stringing devices to cause the cable 94 to be pulled through the cable guiding devices 16 under tension. The cable guiding devices 16 are constructed so that they can withstand the pulling of the cable under relatively high tension as, for example, 3000 lbs. without any difficulty.

The cable guiding device shown in FIGURES 1–5 is what may be called a universal type, that is, it can be utilized for straight pulls as well as for inside corners and outside corners. An inside corner is defined as one in which the pole is within the included angle formed by the cable, whereas an outside corner is one in which the cable is outside the included angle of the cable. Thus, in FIGURE 1, it can be seen that the cable guiding device 16 is being utilized on an outside corner. In an outside corner, it can be seen that the front guide rollers 46 serve as guide means for guiding the cable into a position so that it travels over the large main roller 41 and then leaves the cable guiding device without damaging the cable in any way. The cable, as it passes through the cable guiding device, only engages surfaces which readily roll with the cable. Also, it can be seen that the cable guiding device is constructed in such a manner that the cable cannot escape from the cable guiding device when the cable guiding device is in a closed position. This is because the support member 17 and gate member 18 form an encolsure which encloses the two sides and the top and bottom of the roller, while at the same time permitting the cable to pass through the ends of the device without any difficulty. In addition, it can be seen that the front and rear guide rollers 46 and 47 have been positioned to also prevent the cable 94 from becoming damaged by the flanges 43 of the large roller 41.

Since rear guide rollers 47 have been provided, it can be readily seen that the cable guiding device can also be readily used for inside corners. In such event, the rear guide rollers 47 prevent the cable from being damaged while it is passing through the cable guiding device. The cable guiding device is also very useful for relatively straight runs. In such event, the cable will travel straight through the cable guiding device and may or may not engage the front and rear guide rollers.

After the cable has been pulled through the cable guiding devices 16, the cable is placed under final tension so that it will have the proper sag. The tension is uniformly distributed over the entire length of the cable because the rollers 41 rotate very readily. After the final tensioning has been completed, the cable guiding devices can be removed either by the men climbing the poles or by the use of an aerial lift. In removing the cable guiding devices, the nut 102 is first removed, after which the gate member 18 is swung into an open position. Thereafter, the lineman grasps the cable guiding device and lifts the same very slightly and then shifts the same sidewise to move the cable guiding device so that the bolt travels through the open end of the L-shaped slot 27 provided in the support member 17. As soon as the bolt 98 is clear of the slot 17, the cable guiding device can be lowered away from the cable. Thereafter, a suspension clamp (not shown) of a conventional type is secured to the cable 94 and mounted upon the bolt 98. The lineman then advances to the next poles and completes the same operations in sequence until all the cable guiding devices have been removed.

The construction of the cable guiding device is particularly advantageous because it is mounted directly upon the bolt which is to carry the suspension clamp for the cable itself. Since this is the case, the cable guiding device serves to position the tensioned cable in a position which is very close to the final position of the cable when it is retained by the clamp. This is particularly advantageous because when the cable is finally tensioned for the desired amount of sag, this will not be changed appreciably by the very slight change in movement which occurs after the cable guiding device is removed and it is placed in the suspension clamp. This feature of having the cable guiding device position the cable relatively close to its final position on the pole is also advantageous in that it is unnecessary for the linemen to lift the cable any appreciable distance after the cable guiding device has been removed. In addition, the construction of the cable guiding device is such so that it is unnecessary to appreciably move the cable when the cable guiding device is removed which may be difficult and particularly so if the cable is under high tension or when the cable guiding device is being used on an inside corner. This is true because the cable guiding device can be moved sideways off of the bolt 98.

In certain applications, if it is desired to provide additional means for securing the cable guiding devices to the poles, lag screws can be positioned in the holes 29.

The construction of the cable guiding device shown in FIGURES 1–5 is also particularly advantageous in that many common parts are utilized. For example, all the front and rear guide rollers 46 and 47 are identical as well as the mounting pins and the like.

When it is desired to utilize the cable guiding device 16 as only an inside corner cable guiding device or an outside corner cable guiding device, the appropriate front and rear guide rollers 46 and 47 can be removed. Thus, as shown in FIGURES 6, 7 and 8, the rear guide rollers have been removed to provide an outside corner cable guiding device. This can be readily accomplished by removing the retaining pins 53 and thereafter removing the pins 48 and the rollers 47 carried thereby. Alternatively, when desired, the front guide rollers 46 can be removed in a similar manner to provide an inside corner cable guiding device. Also, it should be readily apparent that such an inside corner cable guiding device or an outside corner cable guiding device can be readily converted to a universal type device by replacing the missing rollers to provide a universal type device which can be used for both types of corners.

It is apparent from the foregoing that we have provided a new and improved cable guiding device which is particularly advantageous for the stringing of wire, cable and the like under tension and which has great versatility. It can be used either as an inside or an outside corner cable guiding device, or it can be utilized as a universal type device which can be used for both types of corners and for straight pulls. The cable guiding device is constructed in such a manner that it can be mounted directly upon the pole without any additional hardware not required for the pole line. It is also constructed so that it is relatively light in weight and so that it can be readily placed upon the pole and removed from the pole after the cable has been placed under tension. In addition, the cable guiding device is mounted in such a manner that the cable can be readily suspended from the pole without any substantial change in the sag of the cable.

We claim:

1. In a cable guiding device, a support member, a roller rotatably mounted on said support member for rotation on an axis, a gate member, and means connecting said gate member to said support member for swinging movement in a direction at right angles to said axis between open and closed positions with respect to said support member, said support member and said gate member including means enclosing the top, bottom and sides of the roller to prevent the escape of cable therefrom when said gate member is in a closed position.

2. A cable guiding device as in claim 1 together with guide rollers mounted on opposite sides of said first named roller and rotatably mounted with respect to said first named roller for rotation on axes substantially perpendicular to the axis of rotation for the first named roller.

3. A cable guiding device as in claim 2 wherein said last named guide roller consists of a pair of spaced parallel rollers rotatably mounted on said support member.

4. A cable guiding device as in claim 2 wherein said last named guide rollers consist of a pair of spaced parallel rollers mounted upon the gate member.

5. A cable guiding device as in claim 2 wherein said last named guide rollers consist of a pair of spaced parallel rollers mounted upon said support member and a pair of spaced parallel rollers mounted upon said gate member.

6. A cable guiding device as in claim 2 wherein said last named guide rollers consist of a pair of spaced parallel rollers mounted on said support member on opposite sides of the first named roller adjacent one extremity of the first named roller and a second pair of spaced parallel rollers mounted upon said gate member and being disposed adjacent the other extremity of the first named roller when the gate member is in a closed position.

7. In a cable guiding device for use on a pole having a bolt provided therein, a support member adapted to rest against the pole, the support member having an opening adapted to accommodate the bolt so that the support member can be carried thereby, and a roller rotatably mounted on said support member for rotation about an axis substantially perpendicular to the pole, a gate member, and means connecting said gate member to said support member for swinging movement between open and closed positions with respect to said support member, said gate member having a hole therein adapted to receive the bolt and to permit a nut to be threaded onto the bolt to hold the gate member in said closed position and to hold the support member on the pole, said support member and said gate member including means for enclosing the first named roller to prevent the escape of cable therefrom when said gate member is in a closed position.

8. A cable guiding device as in claim 7 in which said opening in said support member is in the form of a slot opening to one side to permit the cable guiding device to be removed sideways from the bolt when the gate member is in an open position.

9. A cable guiding device as in claim 7 in which said support member and said gate member are formed with mating surfaces to distribute the load placed on the cable guiding device.

10. A cable guiding device as in claim 7 together with roller means disposed on opposite sides of the first named roller and having an axis of rotation substantially at right angles to the axis of rotation for the first named roller.

11. A cable guiding device as in claim 10 wherein said roller means includes a pair of spaced parallel rollers disposed on opposite sides of one end of the first named roller.

12. A cable guiding device as in claim 7 wherein said roller means includes first and second pairs of spaced parallel rollers disposed adjacent opposite ends of the first named roller.

13. A cable guiding device as in claim 12 wherein one of said pair of spaced parallel rollers is rotatably mounted on the support member and where the other pair of spaced parallel rollers is mounted on the gate member.

14. In a cable guiding device for use on a pole having a bolt provided therein, a support member adapted to rest against the pole, the support member including a front wall and a forwardly extending support arm, a roller, means rotatably mounting said roller upon said front wall and upon said support arm, and a gate member pivotally mounted upon said support arm and movable between open and closed positions with respect to said support arm, said gate member in combination with said support member serving to enclose the sides, top and bottom of the roller, said gate member being formed with a recess adapted to receive at least a portion of the support arm for the roller, said support member and said gate member having means to permit mounting upon the bolt in said pole.

15. A cable guiding device as in claim 14 wherein said support arm is substantially L-shaped and wherein said gate member is substantially L-shaped in side elevation.

16. A cable guiding device as in claim 14 together with roller means disposed on opposite sides of the roller and serving to guide the cable into a position so that it overlies the roller.

17. A cable guiding device as in claim 14 wherein said support member is provided with a slot opening to one side adapted to accommodate the bolt and wherein the gate member is provided with an opening adapted to be positioned in registration with said slot and said support member and to receive said bolt when said gate member is in a closed position.

References Cited

UNITED STATES PATENTS

| 840,009 | 1/1907 | Peirce | 254—134.3 |
| 1,633,489 | 6/1927 | McKissick | 254—193 |
| 2,946,559 | 7/1960 | Pickett | 254—194 |

FOREIGN PATENTS

| 175,089 | 11/1952 | Austria. |
| 292,048 | 6/1928 | Great Britain. |
| 956,742 | 4/1964 | Great Britain. |

EVON C. BLUNK, *Primary Examiner.*

H. C. HORNSBY, *Assistant Examiner.*